US011951931B2

(12) United States Patent
Nishikawa et al.

(10) Patent No.: US 11,951,931 B2
(45) Date of Patent: Apr. 9, 2024

(54) GAS GENERATOR (71) Applicant: DAICEL CORPORATION, Osaka (JP)

(72) Inventors: Yoshiaki Nishikawa, Tokyo (JP); Masato Hirooka, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 359 days.

(21) Appl. No.: 17/422,581

(22) PCT Filed: Feb. 6, 2020

(86) PCT No.: PCT/JP2020/004576
§ 371 (c)(1),
(2) Date: Jul. 13, 2021

(87) PCT Pub. No.: WO2020/162546
PCT Pub. Date: Aug. 13, 2020

(65) Prior Publication Data
US 2022/0097646 A1 Mar. 31, 2022

(30) Foreign Application Priority Data

Feb. 6, 2019 (JP) ................................. 2019-020098

(51) Int. Cl.
*B60R 21/264* (2006.01)
(52) U.S. Cl.
CPC ................... *B60R 21/264* (2013.01)
(58) Field of Classification Search
CPC .................................................. B60R 21/264
(Continued)

(56) References Cited

U.S. PATENT DOCUMENTS 5,346,251 A    9/1994 Burnard et al.
7,510,211 B2 * 3/2009 Clark ...................... F42B 3/103
                                                    280/741
(Continued)

FOREIGN PATENT DOCUMENTS

DE    20 2010 010 354 U1    11/2010
DE    10 2018 107 991 A1    10/2019
(Continued)

OTHER PUBLICATIONS

International Preliminary Report on Patentability and Written Opinion of the International Searching Authority for International Application No. PCT/JP2020/004576, dated Aug. 10, 2021.
(Continued)

*Primary Examiner* — Samir Abdosh
(74) *Attorney, Agent, or Firm* — Birch, Stewart, Kolasch & Birch, LLP (57) ABSTRACT

A gas generator includes, a housing having a first container including a first bottom surface portion and a second container including a second bottom surface portion, the housing being formed by joining the first container and the second container, and an igniter attached to a mounting hole formed in the second bottom surface portion of the second container, the mounting hole including a passing region in the mounting hole, through which the igniter is passing, and a tip region around the passing region, the tip region being located, in a radial direction of the housing, outside an imaginary outer contour line when the igniter is projected onto the second bottom surface portion, in which paired edge portions intersect with each other to form a tip portion having a convex shape protruding outward in the radial direction of the housing on the outermost side of the region.

17 Claims, 8 Drawing Sheets

(58) Field of Classification Search
USPC .......................................................... 102/530
See application file for complete search history.

(56) References Cited

U.S. PATENT DOCUMENTS

| | | | | |
|---|---|---|---|---|
| 2004/0226472 | A1* | 11/2004 | Oda | B60R 21/2644 |
| | | | | 102/205 |
| 2005/0009390 | A1* | 1/2005 | Barker | H01R 13/627 |
| | | | | 439/188 |
| 2011/0221175 | A1* | 9/2011 | Kobayashi | B60R 21/2644 |
| | | | | 280/741 |
| 2016/0052486 | A1* | 2/2016 | Ohsugi | B60R 21/264 |
| | | | | 102/530 |
| 2019/0383589 | A1* | 12/2019 | Boutin | F42B 3/198 |
| 2022/0097646 | A1* | 3/2022 | Nishikawa | B60R 21/264 |
| 2022/0324411 | A1* | 10/2022 | Hirano | F42B 3/12 |

FOREIGN PATENT DOCUMENTS

| | | |
|---|---|---|
| JP | 8-505340 A | 6/1996 |
| JP | 2010-163025 A | 7/2010 |
| JP | 2015-157586 A | 9/2015 |
| JP | 2017-56901 A | 3/2017 |

OTHER PUBLICATIONS

International Search Report for International Application No. PCT/JP2020/004576, dated Apr. 14, 2020.
International Search Report for International Application No. PCT/JP2020/004576, dated Apr. 11, 2020.
German Office Action for German Application No. 11 2020 000 706.5, dated Nov. 20, 2023.

* cited by examiner

GAS GENERATOR

TECHNICAL FIELD

The present invention relates to a gas generator that releases a combustion gas generated by combustion of a gas generating agent.

BACKGROUND ART

In a gas generator that combusts a gas generating agent and releases the generated combustion gas, when pressure in a housing of the gas generator rises excessively for some reason at the time of combustion of the gas generating agent, the housing may break, causing an undesirable effect on a user. Thus, there has been a technique for ensuring safety for a user even in a case where the inside of the housing falls into an over-pressurized state.

For example, Patent Document 1 discloses a gas generator including two housings, that is, an upper housing and a lower housing. A groove having an arc shape is formed in a top surface of one of the housings, and when the gas generator is operated, a gas generating agent is combusted, and the inside of the housings reaches an over-pressurized state where pressure in the housings exceeds a presumed threshold, the groove is configured to rupture to release the pressure in the housings to the outside through the groove before the entire housing is broken. Specifically, the groove is formed in a portion away from a center portion of the top surface of the housing by a fixed distance so as to draw an arc (having a central angle of about 90 degrees) having a center at the center portion.

CITATION LIST

Patent Document

Patent Document 1: JP H08-505340 T

SUMMARY OF INVENTION

Technical Problem

As described above, when pressure in a housing of a gas generator rises excessively, a part of the housing ruptures at a lower pressure to avoid breakage of the housing, and the internal pressure is released to ensure safety for a user. On the other hand, even when pressure release is performed at a stage before such breakage occurs, it must be avoided that a user is undesirably affected due to the pressure release. In the aspect of the prior art, the groove configured to rupture when the inside of the housing reaches an over-pressurized state extends in an arc shape in a portion away from the central portion of the top surface of the housing by a fixed distance, and thus, the rupture of the groove may progress along the arc shape. As a result of the rupture progressing, in some cases, a part of the housing may be torn off and scattered. Even for avoiding breakage, scattering of even a part of the housing is not preferable.

In light of the problem described above, an object of the present specification is to provide a technique in which, when the inside of a housing of a gas generator reaches an over-pressurized state, pressure inside the housing is rapidly reduced to avoid breakage of the housing, without scattering a part of the housing.

Solution to Problem

In order to solve the above problem, an embodiment disclosed in the present specification adopts a configuration in which a mounting hole for attaching an igniter to a housing of a gas generator is utilized and in which the mounting hole is deformed when an over-pressurized state occurs to release pressure in the housing. That is, by making a shape of the mounting hole a shape to which stress in the housing is likely to be applied in a concentrative manner, it is possible to achieve deformation for pressure release with good reproducibility, and it is possible to suitably suppress scattering of a part of the housing.

Specifically, the present embodiment is a gas generator including: a housing having: a first container including a first bottom surface portion and a second container including a second bottom surface portion, the housing being formed by joining the first container and the second container at respective predetermined lateral side portions; and an igniter attached to an mounting hole, the mounting hole connecting an inside and an outside of the housing and being formed in the second bottom surface portion of the second container: Then, in the gas generator, a predetermined region in the housing is filled with a gas generating agent that is combusted by operation of the igniter, a gas discharge port through which a combustion gas generated by the combustion of the gas generating agent is released to the outside of the housing is formed in at least one of the first container and the second container, and the igniter is fixed to the second bottom surface portion of the second container by a predetermined resin material in a state where the igniter is penetrating the mounting hole. The mounting hole has: a passing region through which the igniter is passing in a state where the igniter is fixed; and a tip region around the passing region, the tip region being located, in a radial direction of the housing, outside an imaginary outer contour line when the igniter is projected onto the second bottom surface portion in the state where the igniter is fixed, in which paired edge portions defining a width of the tip region intersect with each other so as to form a tip portion having a convex shape protruding outward in the radial direction of the housing on an outermost side of the tip region.

The housing of the gas generator according to the present embodiment is formed by joining the first container and the second container to which the igniter is attached, at respective predetermined lateral side portions. Here, the "lateral side" refers to the "lateral side" of each of the containers. Furthermore, as the housing according to the present embodiment, there are included: a form in which a housing is formed by joining components other than the bottom surface portions, which are included by the containers and located on lateral sides (for example, a peripheral wall portion connected to a peripheral edge of each of the bottom surface portions, or the like); a form in which a housing is formed by joining the lateral side of the first bottom surface portion and the second container when the first container has only the first bottom surface portion; a form in which the housing is formed by joining the lateral side of the second bottom surface portion and the first container when the second container has only the second bottom surface portion; and the like.

Here, the igniter for combusting the gas generating agent is fixed by a predetermined resin material in a state where the igniter is penetrating the mounting hole formed in the second bottom surface portion of the second container. Preferably, with the igniter fixed, the mounting hole is completely closed by the predetermined resin material. As a result, the combustion gas generated by the operation of the igniter is suitably released through the gas discharge port without leaking out of the mounting hole. In addition, the predetermined resin material may be used with a known technique such as injection molding to insert-mold the igniter to the second bottom surface portion, so that a socket for attaching a cable that supplies drive current to the igniter may be simultaneously molded.

The mounting hole has at least a passing region and a tip region. The passing region is a region which is a part of the mounting hole and through which the igniter is passing in a state where the igniter is fixed. The passing region need not necessarily be at the center of the mounting hole. On the other hand, the tip region is a region located, in the radial direction of the housing, outside an imaginary outer contour line corresponding to the igniter, in the state where the igniter is fixed. The tip region is located relatively around the passing region. The mounting hole may be defined by connection of the passing region and the tip region, and the mounting hole may have a region other than the passing region and the tip region. In such a configuration of the mounting hole, the tip region is to be placed at a position that does not overlap with the igniter when the igniter is projected onto the second bottom surface portion for viewing.

Then, a tip portion having a convex shape protruding outward in the radial direction of the housing is formed by paired edge portions, which define a width of the tip region, intersecting with each other on an outermost side of the tip region. Here, in the housing formed by the above-described joined form, a central portion of the first bottom surface portion of the first container and a central portion of the second bottom surface portion of the second container are not portions to be joined for forming the housing. Due to this, when the igniter is operated and the combustion gas is generated, the first bottom surface portion and the second bottom surface portion are likely to be greatly deflected by the pressure. As a result, when the pressure inside the housing rises excessively for some reason, the stress is likely to act in a concentrative manner on the tip portion included in the tip region of the mounting hole formed in the second bottom surface portion. That is, because the tip portion has a convex shape protruding outward in the radial direction of the housing, stress is concentrated in the convex portion thereof, so that the mounting hole can be deformed so as to rupture outward in the radial direction of the housing in the second bottom surface portion.

In this manner, in the mounting hole, the mounting hole is likely to be deformed so as to extend outward in the radial direction of the housing, and as a result, a part of the housing is less likely to be torn off and scattered. Then, the deformation is guided by the shape of the tip portion with good reproducibility, and as a result of the deformation, the mounting hole extends, and a sealing state with the predetermined resin material is disrupted, so that the pressure in the housing can be suitably released to the outside, thereby suppressing breakage of the housing of the gas generator.

Here, in the gas generator described above, the paired edge portions defining the width of the tip region may be formed in a straight line shape, and the tip region may be formed so that the width of the tip region decreases outward in the radial direction of the housing from the passing region. Alternatively, the paired edge portions defining the width of the tip region may be formed in a curved shape to gradually approach a center line of the tip region passing through the tip portion of the tip region outward in the radial direction of the housing from the passing region, and the tip region may be formed so that the width of the tip region decreases outward in the radial direction of the housing from the passing region. In either form, by forming the tip region so that the width narrows toward the tip side thereof, stress concentration on the tip portion can be suitably generated, and thus, breakage of the housing can be more safely suppressed.

Here, in the gas generator described above, the mounting hole may have a plurality of the tip regions, and the plurality of tip regions may be formed such that extending directions of the tip regions, defined by tip portions of the tip regions and the paired edge portions, do not intersect with each other. With this configuration, when the inside of the housing reaches an over-pressurized state, the first bottom surface portion and the second bottom surface portion of the housing deform, and stress generated by the deformation is applied in a concentrative manner to the tip portions of the tip regions to deform the mounting hole so as to rupture outward in the radial direction of the housing in each of the tip portions. At this time, the plurality of tip regions are formed such that the extending directions of the tip regions do not intersect with each other, and thus, in the deformation, it is possible to suitably suppress tearing-off and scattering of a part of the housing.

Furthermore, in the gas generator described above, a portion of the mounting hole excluding the tip region may be formed in a non-circular shape so as to prevent the predetermined resin material filled in the portion from rotating at the portion. By adopting such a configuration, the filled resin material interferes with the portion having a non-circular shape, which is a part of the mounting hole, so that it is possible to suppress rotation of the resin material at the portion filled with the predetermined resin material. As a result, it is possible to suitably maintain the sealing state in the gas generator.

Here, in the gas generator described above, the first container may further include a first peripheral wall portion connected to a peripheral edge of the first bottom surface portion and located on the lateral side of the first container, the second container may further include a second peripheral wall portion connected to a peripheral edge of the second bottom surface portion and located on the lateral side of the second container, the housing may be formed by joining the first peripheral wall portion and the second peripheral wall portion, and the gas discharge port may be formed in the first peripheral wall portion. The first container may further include a flange portion connected to the first peripheral wall portion, the flange portion being formed such that in a state where the gas generator is attached to a predetermined mounting member via the flange portion, the gas discharge port is located on one side with respect to the predetermined mounting member and the mounting hole is located on a side opposite to the one side.

When the first container includes the flange portion described above and the gas generator is attached to the mounting member via the flange portion, even when pressure in the housing rises excessively, the deformation is caused in the second container in a state where the first container is attached to the mounting member via the flange portion. Furthermore, if the pressure in the housing becomes extremely high at this time and the joining between the first container and the second container is eliminated, the second container may be detached from the first container, but even so, release of a combustion gas through the mounting hole on the second container side and detachment of the second container itself can be consolidated on a side opposite to a side on which the combustion gas is released when the gas generator is operated normally. This makes it easier to protect a user from breakage of the gas generator.

Advantageous Effects of Invention

According to the embodiments disclosed in the present specification, when the inside of a housing of a gas generator reaches an over-pressurized state, it is possible to rapidly reduce the pressure inside the housing to avoid breakage of the housing, without scattering a part of the housing.

DESCRIPTION OF EMBODIMENTS

Forms of gas generators according to embodiments of the present invention will be described hereinafter with reference to the drawings. Note that configurations of the following embodiments are provided as examples, and the present embodiments are not limited to the disclosed configurations. In addition, each of the configurations, combinations thereof, and the like in each of the embodiments are examples, and various additions, omissions, substitutions, and other changes may be made as appropriate without departing from the spirit of the present invention. The disclosure in the present specification is not limited by the embodiments and is limited only by claims. Furthermore, each aspect disclosed in the present specification can be combined with any other feature disclosed herein.

First Embodiment

Figure 1:
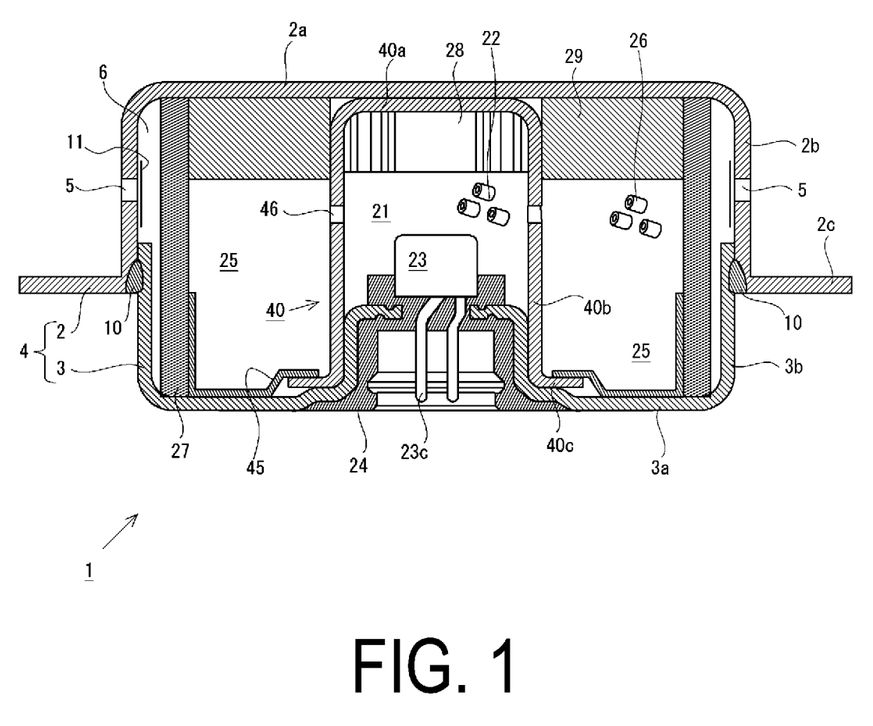
FIG. 1 is a view illustrating a schematic configuration of a gas generator according to an embodiment.

A gas generator 1 according to a first embodiment will be described on the basis of FIG. 1. FIG. 1 is a cross-sectional view in a height direction of the gas generator 1. The gas generator 1 is configured to combust a gas generating agent (a first gas generating agent 22 and a second gas generating agent 26 described later) with which a housing 4 formed of an upper shell 2 (corresponding to a first container) and a lower shell 3 (corresponding to a second container) is filled and release a combustion gas to the outside through a gas discharge port 5 provided in the upper shell 2.

The upper shell 2 includes a bottom surface portion 2a and a peripheral wall portion 2b connected to a peripheral edge of the bottom surface portion 2a, which form an internal space having a concave shape. The peripheral wall portion 2b is provided with a plurality of the gas discharge ports 5. Note that each of the gas discharge ports 5 may be blocked from the inside of the housing 4 by an aluminum tape 11 in order to suppress infiltration of moisture into the housing 4 before an igniter 23 is operated. On the other hand, the lower shell 3 includes a bottom surface portion 3a and a peripheral wall portion 3b connected to a peripheral edge of the bottom surface portion 3a, which form an internal space having a concave shape. The peripheral edge of the bottom surface portion 2a of the upper shell 2 and the peripheral edge of the bottom surface portion 3a of the lower shell 3 each have a substantially circular shape in a top view (a direction of a visual line from top to bottom in FIG. 1), and the peripheral wall portion 2b and the peripheral wall portion 3b surround the bottom surface portion 2a and the bottom surface portion 3a, respectively, and form a peripheral wall surface having an annular shape and extending substantially perpendicularly from each surface portion. The bottom surface portion 2a is connected to one end of the peripheral wall portion 2b, and the other end of the peripheral wall portion 2b serves as an opening of the upper shell 2. The bottom surface portion 3a is connected to one end of the peripheral wall portion 3b, and the other end of the peripheral wall portion 3b serves as an opening of the lower shell 3. In addition, the vicinity of the other end of the peripheral wall portion 2b and the vicinity of the other end of the peripheral wall portion 3b are joined by welding to form the housing 4. The joined portion by welding serves as a joined portion 10 in FIG. 1.

A flange portion 2c is further connected to the peripheral edge on the other end side of the peripheral wall portion 2b of the upper shell 2. The flange portion 2c is an annular plane that is generally perpendicular to the peripheral wall surface of the peripheral wall portion 2b and extends outward in a radial direction of the housing 4. Note that in the present embodiment, the left-right direction in FIG. 1 is defined as the radial direction of the housing 4, and the up-down direction in FIG. 1 is defined as the axial direction of the housing 4. The flange portion 2c is a component for attaching the gas generator 1 to a predetermined mounting device, and has a mounting hole or the like necessary for attachment thereof.

An accommodating member 40 having a generally cylindrical shape is disposed inside the housing 4. The accommodating member 40 includes a bottom surface portion 40a, a peripheral wall portion 40b connected to the bottom surface portion 40a, and a flange portion 40c connected to the peripheral wall portion 40b, and a first space 21 that accommodates the first gas generating agent 22 therein is defined by the bottom surface portion 40a and the peripheral wall portion 40b. The flange portion 40c located at the lower end of the accommodating member 40 is joined by being pressed by a cup 45 disposed on the bottom surface portion 3a of the lower shell 3. Note that the bottom surface portion 40a located on the top end side of the accommodating member 40 in the gas generator 1 is not joined to the bottom surface portion 2a of the upper shell 2, and simply abuts on the bottom surface portion 2a. Alternatively, a gap may be formed between the bottom surface portion 2a and the bottom surface portion 40a. Thus, in the gas generator 1, the upper shell 2 and the lower shell 3 are joined only at the above-described joined portion 10 located on the lateral sides of both the shells to form the housing 4.

In addition, the accommodating member 40 is disposed in the housing 4 to divide the space inside the housing 4 into the first space 21 inside the accommodating member 40 and a second space 25 outside the accommodating member 40. The second space 25 is disposed surrounding the first space 21 and as a result, the gas discharge port 5 formed in the peripheral wall portion 2b of the upper shell 2 is in direct communication with the second space 25. Furthermore, a communication hole 46 that connects the first space 21 and the second space 25 is provided in the accommodating member 40.

Then, the first space 21 is filled with the first gas generating agent 22, and the igniter 23 for combustion thereof is disposed on the bottom surface portion 3a in the first space 21. Note that the detailed configuration of the bottom surface portion 3a will be described later. Furthermore, a cushion 28 is disposed inside the first space 21 and inside the bottom surface portion 40a of the accommodating member 40 in order to suppress unwanted vibration of the first gas generating agent 22 in the first space 21. Furthermore, a filter 27 having a layered shape is disposed in the second space 25 so as to cover the gas discharge port 5 with a fixed gap 6 interposed between the second space 25 and the gas discharge port 5. The filter 27 is formed of flat woven meshes made of stainless steel and configured to cool the combustion gas from the first gas generating agent 22 and the second gas generating agent 26 and filter a combustion residue included in the combustion gas. In addition, the second gas generating agent 26 is filled in the second space 25 between the filter 27 and the accommodating member 40. The second gas generating agent 26 is stably supported by the cup 45 on the bottom surface portion 3a of the lower shell 3, and is pressed by a cushion 29 disposed inside the bottom surface portion 2a with a force suitable for suppressing unwanted vibration of the second gas generating agent 26 in the second space 25. For the first gas generating agent 22 and the second gas generating agent 26, for example, a monoporous cylindrical material made from guanidine nitrate (41 wt. %), basic copper nitrate (49 wt. %), and a binder or an additive may be used.

In the gas generator 1 thus configured, when the igniter 23 is operated, the first gas generating agent 22 is first combusted. The combustion gas of the first gas generating agent 22 flows into the second space 25 from the first space 21 via the communication hole 46, and combustion of the second gas generating agent 26 disposed in the second space 25 is promoted. As a result, the combustion gas of the first gas generating agent 22 and the second gas generating agent 26 is released through the gas discharge port 5 and subjected to a desired purpose of a user.

Figure 2:
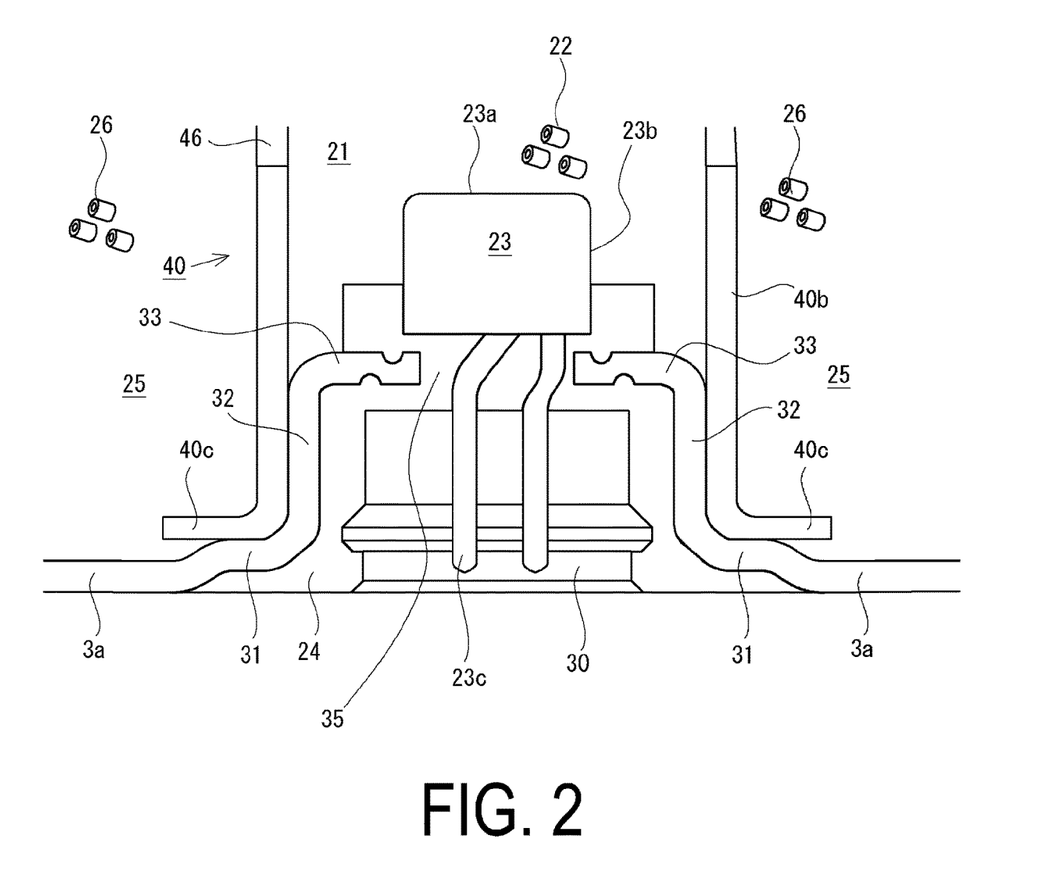
FIG. 2 is an enlarged view illustrating a portion in which an igniter is disposed in the gas generator illustrated in FIG. 1.

Next, a configuration near a fixing portion of the igniter in the bottom surface portion 3a of the lower shell 3 will be described on the basis of FIG. 2. FIG. 2 is an enlarged view of a portion of the gas generator 1 where the igniter 23 is fixed. The igniter 23 has an ignition charge in a space defined by a top surface portion 23a and a side surface portion 23b and is configured such that when the ignition charge is combusted by a drive current supplied from an ignition pin 23c, the combustion product is released from the top surface portion 23a forming a release surface thereof. Here, the bottom surface portion 3a of the lower shell 3 is formed to have a central portion recessed inside the shell, and the igniter 23 is fixed to the central portion. Specifically, in the central portion of the bottom surface portion 3a, a first portion 31, a second portion 32, and a third portion 33 are continuously formed. The first portion 31 is recessed and located one-step inward from the outermost portion of the bottom surface portion 3a, and extends generally in the radial direction of the housing 4 (in a direction toward the peripheral wall portion 3b of the lower shell 3). Then, the second portion 32 is connected to the first portion 31, the second portion 32 extends generally in the axial direction of the housing 4 (in a direction toward the bottom surface portion 2a of the upper shell 2), and a wall surface formed by the second portion 32 is fitted inside the accommodating member 40 to position the accommodating member 40 in the housing 4. When the accommodating member 40 is positioned, the flange portion 40c located at the lower end portion of the accommodating member 40 abuts on the first portion 31 as illustrated in FIG. 2. Note that the first portion 31 need not be provided.

Furthermore, the third portion 33 is connected to the second portion 32, and the third portion 33 extends generally in the radial direction of the housing 4 (in a direction toward the ignition pin 23c described below). A mounting hole 35, which is a through hole, is formed in a central portion of the third portion 33. The mounting hole 35 is a hole for attaching the igniter 23 to the bottom surface portion 3a of the lower shell 3. As illustrated in FIG. 2, the igniter 23 is fixed to the bottom surface portion 3a in a state where the igniter 23 is penetrating the mounting hole 35 such that the top surface portion 23a of the igniter 23 is located inside the housing 4 for releasing a combustion product of the ignition charge generated by operation of the igniter 23 into the inside of the housing 4, and such that the ignition pin 23c for supplying the drive current necessary for operation of the igniter 23 is exposed to the outside of the housing 4. Note that when fixing the igniter 23, the igniter 23 is insert-molded with a predetermined resin material 24 in a state where the igniter 23 is positioned so as to reach a predetermined position with respect to the bottom surface portion 3a of the lower shell 3. Then, at this time, a socket 30 is simultaneously molded by the resin material 24 so that a connector for supplying the drive current to the ignition pin 23c of the igniter 23 can be fitted. The resin material 24 fills the entire mounting hole 35 including a tip region R2.

Figure 3:
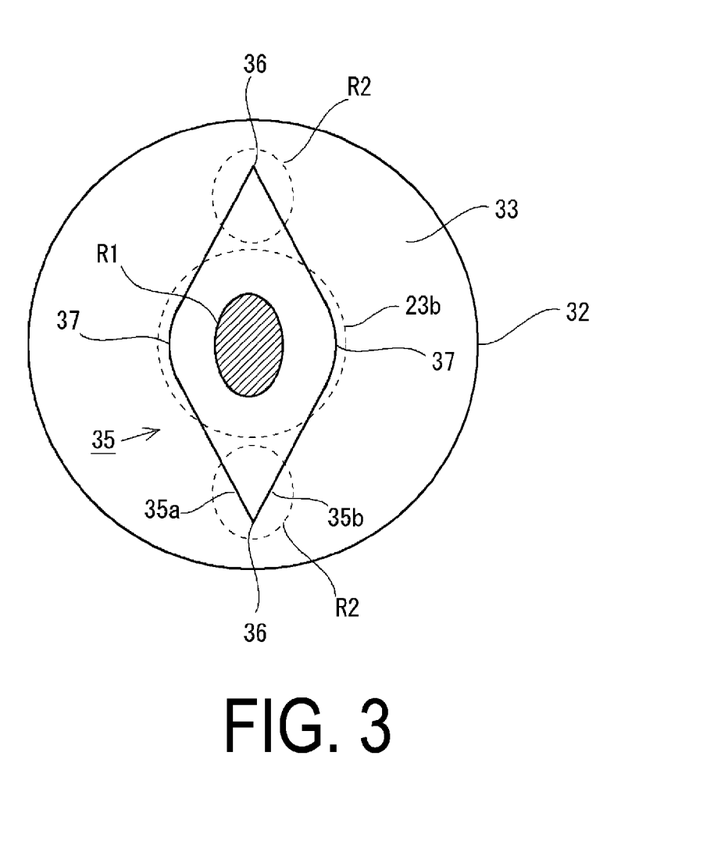
FIG. 3 is a first view illustrating a mounting hole for attaching the igniter.

Next, the mounting hole 35 will be described on the basis of FIG. 3. FIG. 3 is a view of the mounting hole 35 formed in the third portion 33 of the bottom surface portion 3a when viewed from above, that is, when viewed from the upper shell 2 side, and the description of the igniter 23 is omitted for the purpose of explanation. However, in order to be able to understand the correlation between the igniter 23 and the mounting hole 35, the side surface portion 23b (outer contour portion of a portion where the ignition charge is accommodated) of the igniter 23 in a state in which the igniter 23 is fixed to the bottom surface portion 3a is drawn with a dashed line overlapping. The side surface portion 23b is indicated by the dashed line overlapping in this manner because the side surface portion 23b of the igniter 23 is the widest portion in the radial direction of the housing 4. The dashed line representing the side surface portion 23b corresponds to an imaginary outer contour line when the igniter 23 is projected onto the bottom surface portion 3a.

As illustrated in FIG. 3, the mounting hole 35 has a shape generally close to a diamond shape. However, of four corners of the mounting hole 35, corners each corresponding to a tip portion 36 described later are formed sharply, while the remaining two corners 37 are formed of edge portions of the mounting hole 35 gently intersecting with each other. In addition, the mounting hole 35 includes a passing region R1 in a central portion thereof in a state where the igniter 23 is fixed to the bottom surface portion 3a. As described above, the igniter 23 is fixed in a state where the igniter 23 is penetrating the mounting hole 35. A region which is a part of the mounting hole 35, through which the igniter 23 is passing at this time, specifically, a region through which the ignition pin 23c of the igniter 23 is passing, is defined as the passing region R1. This passing region R1 is located overlapping the side surface portion 23b as illustrated in FIG. 3.

Furthermore, the mounting hole 35 includes the tip region R2 around the passing region R1, which is located, in the radial direction of the housing 4, outside the dashed line representing the side surface portion 23b, that is, located so as not to overlap with the side surface portion 23b in FIG.

3. Here, the tip region R2 includes the tip portion 36 of the mounting hole 35. The tip portion 36 is a portion of the mounting hole 35, which is farthest away from the dashed line representing the side surface portion 23b. A width of the tip region R2 is defined by paired edge portions 35a, 35b of the tip region R2 located on both sides with respect to the tip portion 36. For example, the width of the tip region R2 in FIG. 3 is derived as a distance between the edge portions 35a, 35b located from side to side with respect to the tip portion 36. In the tip region R2 illustrated in FIG. 3, both the edge portions 35a, 35b are formed in a straight line shape and are formed so that the width of the tip region R2 decreases outward in the radial direction of the housing 4 from the passing region R1. That is, the tip portion 36 of the tip region R2 is formed by the edge portions 35a, 35b intersecting with each other at an acute angle, and has a convex shape protruding outward in the radial direction of the housing 4 on an outermost side of the tip region R2.

When the mounting hole 35 is formed in this manner, as illustrated in FIG. 3, the tip region R2, which is a part of the mounting hole 35, has a relative relationship in which the tip region R2 does not overlap with the igniter 23. Note that in a state where the gas generator 1 is actually formed, as illustrated in FIG. 2, the resin material 24 is interposed between the igniter 23 and the bottom surface portion 3a of the lower shell 3, the igniter 23 is fixed to the bottom surface portion 3a, and the inside of the housing 4 is sealed to a degree that allows suitable combustion of the first gas generating agent 22 and the second gas generating agent 26.

Figure 4:
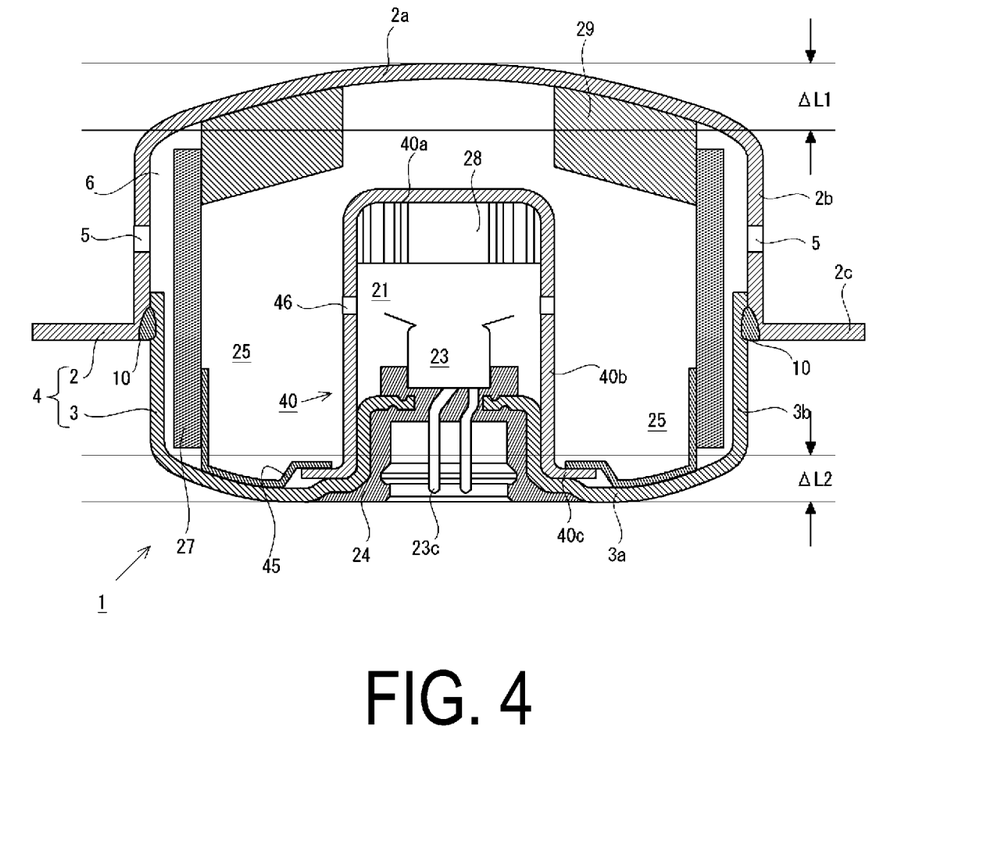
FIG. 4 is a view illustrating a state when the gas generator illustrated in FIG. 1 is operated.

Here, a state of the gas generator 1 when the igniter 23 is operated is illustrated in FIG. 4. When the igniter 23 is operated, the first gas generating agent 22 and the second gas generating agent 26 which are filled in the housing 4 are combusted, and the generated combustion gas is filled into the housing 4 and released to the outside of the housing 4 through the gas discharge port 5. Here, as described above, in the gas generator 1, the upper shell 2 and the lower shell 3 that form the housing 4 are joined by welding at the respective peripheral wall portions 2b, 3b, and are not joined at the central portions of the upper shell 2 and the lower shell 3. Furthermore, the bottom surface portion 40a of the accommodating member 40 is not joined to the bottom surface portion 2a of the upper shell 2. Thus, when the combustion gas is generated by combustion of the first gas generating agent 22 and the second gas generating agent 26, the upper shell 2 and the lower shell 3 deform so as to expand outward in the axial direction due to increase in pressure in the housing 4, as illustrated in FIG. 4. In the upper shell 2, an amount of deformation near the central portion thereof in the radial direction is the largest, which is ΔL1, and in the lower shell 3, similarly, an amount of deflection near the central portion thereof is the largest, which is ΔL2. In consideration of the increase in pressure in the housing 4, the shape and strength of the upper shell 2 and the lower shell 3 are designed so that the housing 4 does not be broken.

However, as a result of combustion of the first gas generating agent 22 and the second gas generating agent 26, when a pressure in the housing 4 exceeds a presumed threshold for some reason, the housing 4 may not withstand the pressure in terms of strength and may be broken. Such breakage of the housing 4 should be avoided as much as possible for safety for a user. Here, in the gas generator 1 of the present embodiment, the mounting hole 35 to which the igniter 23 is attached is formed as illustrated in FIG. 3. Thus, even if the inside of the housing 4 reaches an over-pressurized state where pressure in the housing 4 exceeds a presumed threshold, breakage of the housing 4 described above can be suitably suppressed.

Figure 5:
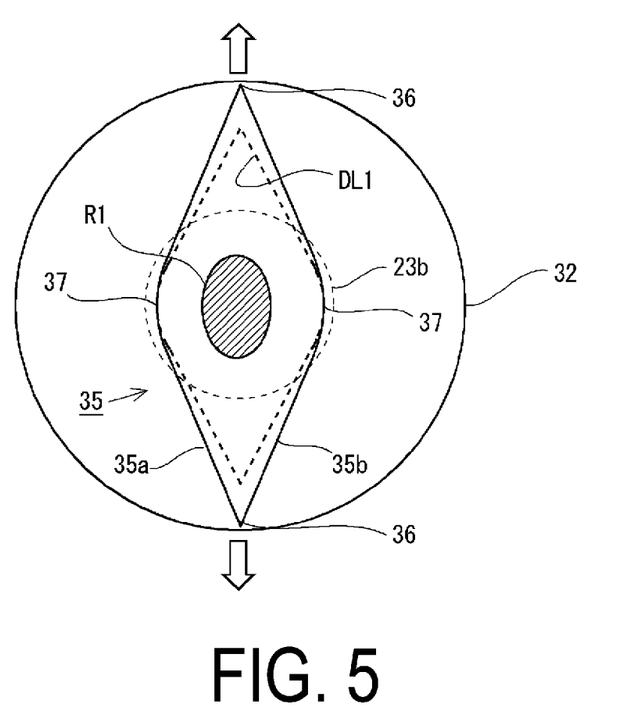
FIG. 5 is a view illustrating a state of deformation of the mounting hole when the gas generator illustrated in FIG. 1 is operated.

In other words, the tip portion 36 of the tip region R2 of the mounting hole 35 does not overlap with the igniter 23 as illustrated in FIG. 3 and has the convex shape protruding the most outward in the radial direction of the housing 4, and thus, when the inside of the housing 4 reaches an over-pressurized state, the excessive stress is likely to be applied in a concentrative manner to the tip portion 36. In particular, the third portion 33 in which the mounting hole 35 is provided is located in a generally central portion of the bottom surface portion 3a of the lower shell 3, and thus, as can be seen in FIG. 4, the third portion 33 is one of portions of the housing 4, which deform the most when the igniter 23 is operated, whereby stress is likely to be applied in a concentrative manner to the tip portion 36. As a result, as illustrated in FIG. 5, due to the excessive load, in the tip portion 36 of the mounting hole 35 in the bottom surface portion 3a, stress is most likely to be concentrated, and rupture easily proceeds. An outlined arrow in FIG. 5 represents a direction in which stress is applied to the tip portion 36, in other words, a rupture direction of the mounting hole 35. The rupture direction of the tip portion 36 of the mounting hole 35 is schematically an extending direction of the tip region R2, that is, a radiation direction in the bottom surface portion 3a. Note that the corners 37 of the mounting hole 35 excluding the corners of the tip portions 36 are disposed overlapping with the igniter 23 as described above and are formed by the edge portions of the mounting hole 35 gently intersecting, and thus, the above excessive stress is less likely to be applied as compared to the corners of the tip portions 36. Accordingly, when the inside of the housing 4 reaches an over-pressurized state, the tip portion 36 of the mounting hole 35 suitably ruptures in the extending direction of the tip region R2, that is, the mounting hole 35 deforms so that the tip portion 36 expands outward in the radial direction of the housing 4.

When the tip portion 36 of the mounting hole 35 ruptures in the extending direction of the tip region R2, a gap is generated between the resin material 24 forming the socket 30 and the bottom surface portion 3a of the lower shell 3 to reduce the sealing state of the housing 4. As a result, it is possible to release the combustion gas filled in the housing 4 to the outside of the housing 4 to rapidly eliminate the over-pressurized state. In this way, in the gas generator 1 according to the present embodiment, a part of the mounting hole 35 for attaching the igniter 23 has a shape to which pressure inside the housing 4 is likely to be applied in a concentrative manner, thereby releasing the combustion gas from the vicinity of the igniter 23 to the outside.

Furthermore, the mounting hole 35 illustrated in FIG. 3 has two tip regions R2, each of which includes the tip portion 36. In addition, extending directions of the tip regions R2 are opposite to each other (directions that differ by 180 degrees in the bottom surface portion 3a). Due to this, even if the tip portions 36 are deformed in the extending directions of the tip regions R2, trajectories of the tip portions 36 do not intersect with each other. This means that deformation of the tip portions 36 can suitably avoid torn-off and scattering of a part of the bottom surface portion 3a of the lower shell 3, which greatly contributes to improvement of safety of the gas generator 1.

Figure 6:
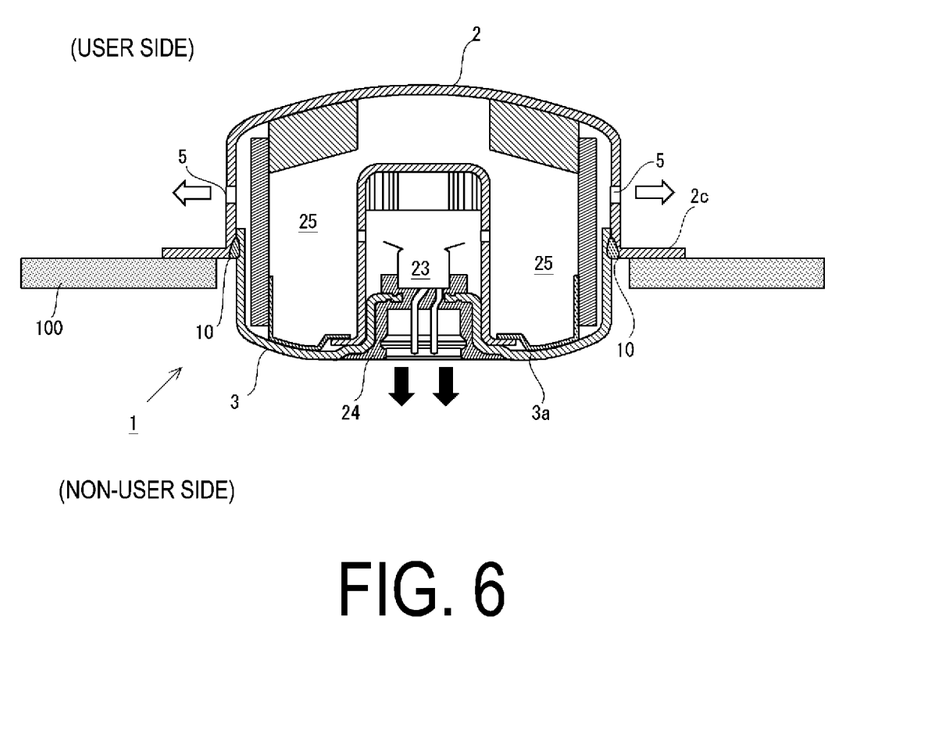
FIG. 6 is a view illustrating a state when the gas generator illustrated in FIG. 1 is operated in a state where the gas generator is attached to a mounting device.

Here, FIG. 6 illustrates a state where the gas generator 1 is attached to a mounting device 100 via the flange portion 2c of the upper shell 2. Note that although not illustrated in the drawing, the flange portion 2c is firmly fixed to the mounting device 100 by a mechanical fastening means such as a bolt or the like. When the gas generator 1 is operated normally, that is, when the inside of the housing 4 does not reach an over-pressurized state, the combustion gas is supplied to a side (user side) on which a user is present through the gas discharge port 5 (outlined arrows in FIG. 6 represent normally-supplied combustion gas). The combustion gas supplied to the user side serves as a drive source of an apparatus for achieving a predetermined action on the user. As an example, the combustion gas can be used as a drive source for instantaneously inflating an airbag to protect a user from an impact. Note that in the present embodiment, the user side and a side (non-user side) on which no user is present are isolated by the mounting device 100.

On the other hand, in a case where the inside of the housing 4 reaches an over-pressurized state when the gas generator 1 is operated, the above-described deformation of the mounting hole 35 of the igniter 23 causes the deterioration of the sealing state between the resin material 24 and the bottom surface portion 3*a* of the lower shell 3 to release the combustion gas filled in the housing 4, which is a factor of the over-pressurized state, to the non-user side (black arrows in FIG. 6 represent the combustion gas released by the deformation of the mounting hole 35). As a result, it is possible to avoid flying of components to an occupant side due to breakage of the housing 4, and combustion gas is released to a space isolated from a user by the mounting device 100, whereby it is possible to maintain the safety of the user extremely high. Furthermore, even if the upper shell 2 and the lower shell 3 are separated by breakage of the joined portion 10 or the like by any chance, the upper shell 2 is firmly attached to the mounting device 100 via the flange portion 2*c*, while the lower shell 3 is disposed on the non-user side, so that no object flies to the user side.

First Modified Example

A first modified example of the mounting hole 35 that can be applied to the gas generator 1 will be described on the basis of FIG. 7. A mounting hole 35 of the present modified example has a shape that is generally close to a hexagon. However, of six corners of the mounting hole 35, corners corresponding to tip portions 36 are sharply formed as described later, while remaining four corners 37 are formed by edge portions of the mounting hole 35 gently intersecting. Also in the present modified example, the mounting hole 35 includes a passing region R1 in a central portion thereof and tip regions R2 around the passing region R1, which is located, in the radial direction of the housing 4, outside a dashed line representing the side surface portion 23*b* in a state where the igniter 23 is fixed to the bottom surface portion 3*a*. Here, each of the tip regions R2 includes the tip portion 36 of the mounting hole 35, and in the present modified example as well, the tip portion 36 is a portion of the mounting hole 35, which is farthest away from the dashed line representing the side surface portion 23*b*.

The width of each of the tip regions R2 is defined by paired edge portions 35*a*, 35*b* of the tip region R2 located on both sides with the tip portion 36 in the center. In each of the tip regions R2 illustrated in FIG. 7, the paired edge portions 35*a*, 35*b* are formed in a curved shape so as to gradually approach a center line L1 of the tip region R2 passing through the tip portion 36 of the tip region R2 outward in the radial direction of the housing 4 from the passing region R1. As a result, the width of each of the tip regions R2 is formed so as to decrease outward in the radial direction of the housing 4 from the passing region R1. As a result, the corner of the tip portion 36 is formed extremely sharply as compared to the other corners 37 of the mounting hole 35, and thus the tip portion 36 has a convex shape protruding outward in the radial direction of the housing 4 on an outermost side of the tip region R2.

Figure 7:
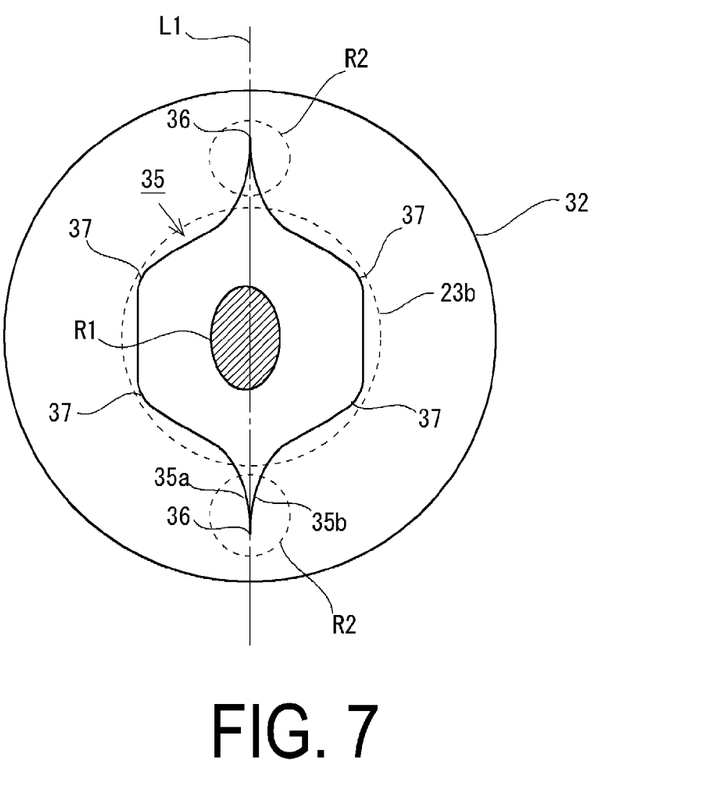
FIG. 7 is a second view illustrating a mounting hole for attaching the igniter.

When the mounting hole 35 is formed in this manner, the tip portion 36 of the tip region R2 of the mounting hole 35 does not overlap with the igniter 23 as illustrated in FIG. 7 and has the convex shape protruding the most outward in the radial direction of the housing 4, and thus, if the inside of the housing 4 reaches an over-pressurized state, the excessive stress is likely to be applied in a concentrative manner to the tip portion 36. As a result, in the same manner as in the embodiment illustrated in FIG. 5, due to the excessive pressure, rupture is likely to occur in the tip portion 36 of the mounting hole 35 in the bottom surface portion 3*a*. Then, it is possible to rapidly release the combustion gas in the housing 4 to the outside through the ruptured mounting hole 35, thereby avoiding breakage of the housing 4. In addition, it can be readily understood that portions of the mounting hole 35 excluding the tip regions R2 have a non-circular shape that is generally close to a hexagon. Accordingly, the resin material 24 filled for fixing the igniter 23 interferes with many portions of the mounting hole 35 and is suitably prevented from rotating in the mounting hole 35.

Second Modified Example

Figure 8:
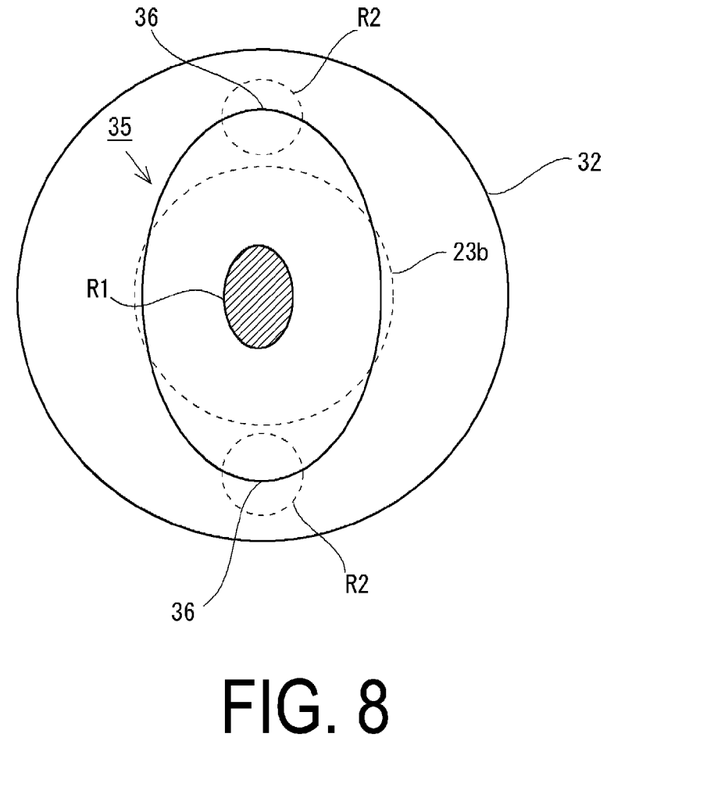
FIG. 8 is a third view illustrating a mounting hole for attaching the igniter.

A second modified example of the mounting hole 35 that can be applied to the gas generator 1 will be described on the basis of FIG. 8. A mounting hole 35 of the present modified example has a generally elliptical shape, and in FIG. 8, the mounting hole 35 of an elliptical shape having a long axis in the up-down direction is illustrated. Also in the present modified example, the mounting hole 35 includes a passing region R1 in a central portion thereof and tip regions R2 around the passing region R1, which is located, in the radial direction of the housing 4, outside a dashed line representing the side surface portion 23*b* in a state in which the igniter 23 is fixed to the bottom surface portion 3*a*. Here, each of the tip regions R2 includes a tip portion 36 of the mounting hole 35, and in the present modified example as well, the tip portion 36 is a portion of the mounting hole 35, which is farthest away from the dashed line representing the side surface portion 23*b* and has a convex shape protruding outward in the radial direction of the housing 4.

By applying the mounting hole 35 formed in this manner, even if the inside of the housing 4 reaches an over-pressurized state, the excessive stress is likely to be applied in a concentrative manner to the tip portion 36, whereby rupture is likely to occur in the radiation direction from the tip portion 36 of the mounting hole 35 in the bottom surface portion 3*a*. Then, it is possible to rapidly release the combustion gas in the housing 4 to the outside through the ruptured mounting hole 35 to avoid breakage of the housing 4. Note that a tip portion 36 such as that illustrated in FIG. 3 or FIG. 7 may be formed on the tip portion 36.

Other Modified Examples

The housing 4 of the gas generator 1 illustrated in FIG. 1 is formed by joining the upper shell 2 and the lower shell 3 each having a concave shape by welding at the peripheral wall portions 2*b*, 3*b* located on the lateral sides of the shells. Instead of such an aspect, a housing may be applied to the gas generator 1, in which the upper shell 2 is formed substantially only of the bottom surface portion 2*a* and in which a lateral side end portion of the upper shell 2 (bottom surface portion 2a) and the peripheral wall portion 3b of the lower shell 3 are joined by welding as if the upper shell 2 (bottom surface portion 2a) is a lid closing an opening of the lower shell 3. At this time, the gas discharge port 5 is provided in the peripheral wall portion 3b of the lower shell 3. Alternatively, a housing may be applied to the gas generator 1, in which the lower shell 3 is formed substantially only of the bottom surface portion 3a and in which a lateral side end portion of the lower shell 3 (bottom surface portion 3a) and the peripheral wall portion 2b of the upper shell 2 are joined by welding as if the lower shell 3 (bottom surface portion 3a) is a lid closing an opening of the upper shell 2. At this time, the gas discharge port 5 is provided in the peripheral wall portion 2b of the upper shell 2.

Also in the housing 4 formed in this manner, the upper shell 2 and the lower shell 3 are substantially joined only on the lateral sides thereof and thus, the bottom surface portion 2a of the upper shell 2 and the bottom surface portion 3a of the lower shell 3 are likely to be greatly deflected when the igniter 23 is operated. Accordingly, similarly to the above-described embodiment, it can be considered that it is extremely useful to apply the disclosed mounting holes 35.

REFERENCE SIGNS LIST

1: Gas generator
2: Upper shell
2a: Bottom surface portion
2b: Peripheral wall portion
2c: Flange portion
3: Lower shell
3a: Bottom surface portion
3b: Peripheral wall portion
4: Housing
5: Gas discharge port
10: Joined portion
22: First gas generating agent
23: Igniter
23a: Top surface portion
23b: Side surface portion
24: Resin material
26: Second gas generating agent
27: Filter
35: Mounting hole
35a: Edge portion
35b: Edge portion
36: Tip portion
100: Mounting device
L1: Center line
R1: Passing region
R2: Tip region

The invention claimed is:

1. A gas generator, comprising:
a housing having a first container including a first bottom surface portion and a second container including a second bottom surface portion, the housing being formed by joining the first container and the second container at respective predetermined lateral side portions;
an igniter attached to a mounting hole, the mounting hole connecting an inside and an outside of the housing and being formed in the second bottom surface portion of the second container;
a gas generating agent that is combusted by an operation of the igniter being filled in a predetermined region in the housing;
a gas discharge port through which a combustion gas generated by combustion of the gas generating agent is released to the outside of the housing being formed in at least one of the first container and the second container; and
the igniter being fixed to the second bottom surface portion of the second container by a predetermined resin material in a state where the igniter is penetrating the mounting hole, wherein
the mounting hole has:
a passing region through which the igniter is passing in the mounting hole in a state where the igniter is fixed; and
a tip region around the passing region, the tip region being located in a radial direction of the housing outside an outer periphery of the igniter when the igniter is projected onto the second bottom surface portion in a state where the igniter is fixed, in which paired edge portions defining a width of the tip region intersect with each other to form a tip portion having a convex shape protruding outward in the radial direction of the housing on an outermost side of the tip region.

2. The gas generator according to claim 1, wherein
the paired edge portions defining the width of the tip region are formed in a linear shape, and
the tip region is formed so that the width of the tip region decreases outward in the radial direction of the housing from the passing region.

3. The gas generator according to claim 1, wherein
the paired edge portions defining the width of the tip region are formed in a curved shape so as to gradually approach a center line of the tip region passing through the tip portion of the tip region outward in the radial direction of the housing from the passing region, and
the tip region is formed so that the width of the tip region decreases outward in the radial direction of the housing from the passing region.

4. The gas generator according to claim 1, wherein
the mounting hole has a plurality of the tip regions, and
each of the plurality of the tip regions is formed so that extending directions of the tip regions, each of which is defined by the tip portion of the tip region and the paired edge portions, do not intersect with each other.

5. The gas generator according to claim 1, wherein
a portion of the mounting hole excluding the tip region is formed in a non-circular shape so as to prevent the predetermined resin material filled in the portion from rotating at the portion.

6. The gas generator according to claim 1, wherein
the first container further includes a first peripheral wall portion connected to a peripheral edge of the first bottom surface portion and located on a lateral side of the first container,
the second container further includes a second peripheral wall portion connected to a peripheral edge of the second bottom surface portion and located on a lateral side of the second container,
the housing is formed by joining the first peripheral wall portion and the second peripheral wall portion,
the gas discharge port is formed in the first peripheral wall portion, and
the first container further includes a flange portion connected to the first peripheral wall portion, the flange portion being formed so that in a state where the gas generator is attached to a predetermined mounting member via the flange portion, the gas discharge port is located on one side with respect to the predetermined mounting member and the mounting hole is located on a side opposite to the one side.

7. The gas generator according to claim 2, wherein the mounting hole has a plurality of the tip regions, and each of the plurality of the tip regions is formed so that extending directions of the tip regions, each of which is defined by the tip portion of the tip region and the paired edge portions, do not intersect with each other.

8. The gas generator according to claim 3, wherein the mounting hole has a plurality of the tip regions, and each of the plurality of the tip regions is formed so that extending directions of the tip regions, each of which is defined by the tip portion of the tip region and the paired edge portions, do not intersect with each other.

9. The gas generator according to claim 2, wherein a portion of the mounting hole excluding the tip region is formed in a non-circular shape so as to prevent the predetermined resin material filled in the portion from rotating at the portion.

10. The gas generator according to claim 3, wherein a portion of the mounting hole excluding the tip region is formed in a non-circular shape so as to prevent the predetermined resin material filled in the portion from rotating at the portion.

11. The gas generator according to claim 4, wherein a portion of the mounting hole excluding the tip region is formed in a non-circular shape so as to prevent the predetermined resin material filled in the portion from rotating at the portion.

12. The gas generator according to claim 2, wherein the first container further includes a first peripheral wall portion connected to a peripheral edge of the first bottom surface portion and located on a lateral side of the first container,
the second container further includes a second peripheral wall portion connected to a peripheral edge of the second bottom surface portion and located on a lateral side of the second container,
the housing is formed by joining the first peripheral wall portion and the second peripheral wall portion,
the gas discharge port is formed in the first peripheral wall portion, and
the first container further includes a flange portion connected to the first peripheral wall portion, the flange portion being formed so that in a state where the gas generator is attached to a predetermined mounting member via the flange portion, the gas discharge port is located on one side with respect to the predetermined mounting member and the mounting hole is located on a side opposite to the one side.

13. The gas generator according to claim 3, wherein the first container further includes a first peripheral wall portion connected to a peripheral edge of the first bottom surface portion and located on a lateral side of the first container,
the second container further includes a second peripheral wall portion connected to a peripheral edge of the second bottom surface portion and located on a lateral side of the second container,
the housing is formed by joining the first peripheral wall portion and the second peripheral wall portion,
the gas discharge port is formed in the first peripheral wall portion, and
the first container further includes a flange portion connected to the first peripheral wall portion, the flange portion being formed so that in a state where the gas generator is attached to a predetermined mounting member via the flange portion, the gas discharge port is located on one side with respect to the predetermined mounting member and the mounting hole is located on a side opposite to the one side.

14. The gas generator according to claim 1, wherein of corners of the mounting hole, corners each corresponding to the tip portion are formed sharply, while the remaining corners are formed of edge portions of the mounting hole gently intersecting with each other.

15. The gas generator according to claim 1, wherein the tip portion is a portion of the mounting hole, which is farthest away from a side surface portion of the igniter.

16. The gas generator according to claim 1, wherein corners of the mounting hole excluding the corners of the tip portions are disposed overlapping with the igniter and are formed by the edge portions of the mounting hole gently intersecting.

17. The gas generator according to claim 1, wherein the mounting hole has a plurality of the tip regions, and extending directions of the tip regions are opposite to each other.

* * * * *